May 22, 1934.  N. H. RICKER  1,960,027

METHOD OF ELECTRICAL PROSPECTING

Filed March 24, 1930  2 Sheets-Sheet 2

NORMAN H. RICKER
INVENTOR

BY Jesse R Stone
Lester B Clark
ATTORNEYS

Patented May 22, 1934

1,960,027

UNITED STATES PATENT OFFICE 1,960,027

METHOD OF ELECTRICAL PROSPECTING

Norman H. Ricker, Houston, Tex.

Application March 24, 1930, Serial No. 438,354

14 Claims. (Cl. 175—182)

The invention relates to electrical methods of prospecting for oil, gas, water, ore bodies, and any other buried masses whose electromagnetic constants are different from those of the surrounding earth.

The invention lies in the realm of electromagnetic prospecting and embodies certain novel principles which make prospecting very much simplified and extends the usefulness of prospecting by electromagnetic methods. It is intended that the invention make use of principles of symmetry, and recognizes the elliptical or rotating nature of the electromagnetic field in the neighborhood of a conducting mass. The fundamental ideas of this invention are concerned with the setting up of an alternating electromagnetic field which, when set up in a region where the earth's subsurface is homogeneous and the earth's surface is a horizontal plane, would possess symmetry about a vertical axis.

It is one of the objects of the invention to provide an electromagnetic field which normally possesses axial symmetry about a vertical axis under homogeneous conditions but which is subject to distortion by the nonhomogeneity of the subsurface formation.

Another object of the invention is to devise an apparatus for setting up such an electromagnetic field which normally possesses axial symmetry about a line perpendicular to the earth's surface.

Still another object of the invention is to set up an electromagnetic field by disposing a circular loop of wire on or parallel to the earth's surface and passing an alternating current therethrough.

Another object of the invention is to provide a solenoid placed so that its axis is vertical, and pass an alternating current through its windings in such a manner that an electromagnetic field normally symmetrical about its axis will be created.

Still another object of the invention is to provide a vertical antenna which will set up an electromagnetic field about the axis of the antenna.

A still further object of the invention is to provide an electromagnetic field normally possessing axial symmetry about a vertical axis by means of two electrodes, one spaced vertically above the other.

It is also an object of the invention to make observations of such an electromagnetic field to determine the nature of the subsurface of the earth by noting the variations from the symmetrical distribution of the field which would normally obtain.

Other and further objects of the invention will be readily apparent to those skilled in the art when the following description is considered in connection with the accompanying drawings wherein Fig. 1 shows a means of setting up a symmetrical electromagnetic field by disposing a loop of conducting material upon the earth's surface.

Various methods and apparatus may be employed to set up the electromagnetic field. In this application I have disclosed several such arrangements of apparatus, but it is intended that the invention may be practiced in any desired manner. In order that it may be readily understood each of the modifications will be explained in detail.

Figure 1:
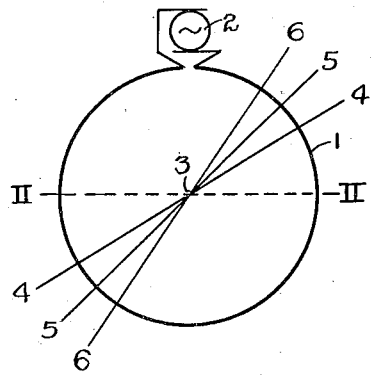
Figure 2:
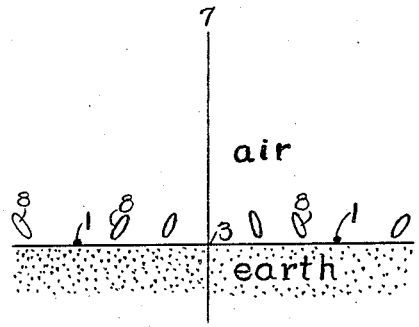
Fig. 2 is a section taken on the line II—II of Fig. 1.
Figure 8:
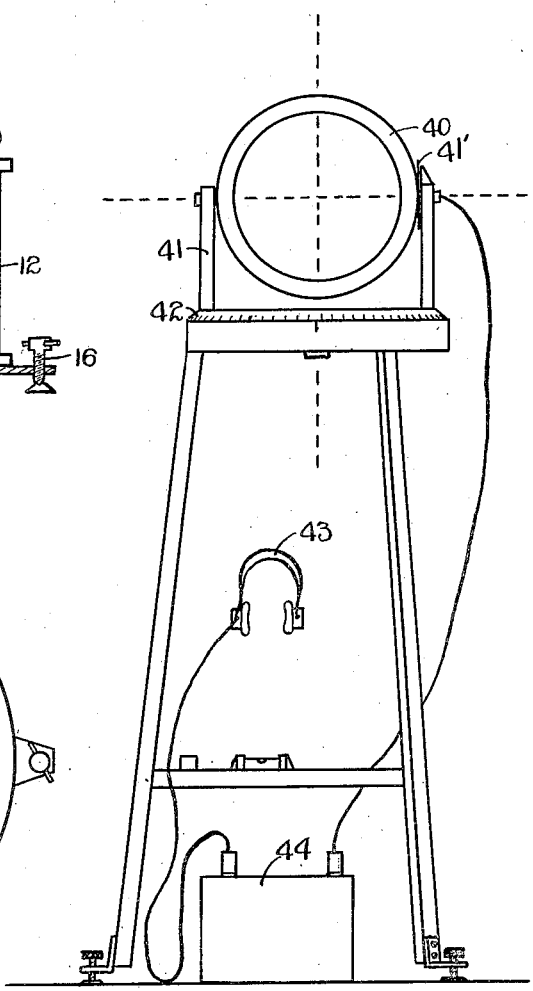
Fig. 8 shows one form of apparatus which may be used in connection with the invention for making observations of the electromagnetic field.

The invention may be practiced by creating the electromagnetic field as shown in Figs. 1 and 2. This comprises laying a large circle 1 of wire, or other conducting material, upon or adjacent and parallel to the earth's surface. This circle of wire may be of any desired diameter and might be of considerable size. The ends of this wire are connected with a generator 2 so that an alternating electric current may be passed about the circle. It will be readily apparent that the electromagnetic field set up by the alternating current passing about the circle 1 will possess axial symmetry. The center of the circle has been indicated at 3 where the lines 4, 5 and 6 are illustrations of vertical planes passing through the axis of symmetry shown at 7 in Fig. 2. This axis of symmetry passes through the center point 3 of the circle. The magnetic component of the electromagnetic field set up by the current in the circle 1 may be observed by the apparatus shown in Fig. 8 or any similar type of apparatus which includes a loop such as 40, which is mounted upon uprights 41, which are in turn connected with a rotatable scale or dial 42. A scale 41' is carried by one of the uprights 41 so that the tilting of the loop from the vertical plane may be observed. In this manner the loop 40 may be rotated or oscillated at any desired angle about either the vertical or horizontal axis which axes are indicated in dotted lines in Fig. 8.

A pair of head phones 43 or other apparatus may be used to indicate the sound or the absence of sound in the loop. A vacuum tube amplifier 44 is provided to amplify the feeble loop currents until they are sufficiently strong to actuate the telephone receivers 43. In practising the invention the receiving mechanism will be disposed in any desired position with respect to the circle 1 upon any of the imaginary planes such as 4, 5 and 6, which means at any point in space. It is to be understood that these planes are merely representative of positions. If I wish to detect a loss of symmetry by noting the departure of the plane of the vibration ellipse from the vertical, I rotate the loop about both vertical and horizontal axes until the sound vanishes. If the subsurface is homogeneous the plane of the vibration ellipse, which is indicated by the various figures designated by the numeral 8 in Fig. 2, will lie in a vertical plane, while the electric lines of force run in coaxial circles parallel to the surface of the earth and having the axis of symmetry as a common axis. The electric lines of force are not elliptically polarized. However, if the subsurface is nonhomogeneous the plane of the vibration ellipse of the magnetic field will lie at an angle with respect to the vertical, and this distortion may be readily observed and plotted in a suitable manner which will define the extent of the buried mass which has destroyed the symmetry of the field.

The advantage of the invention as practiced in this application resides in the fact that observations may be taken at any desired location, either within or without the circle 1. In taking observations in this manner it is unnecessary to set up the receiving apparatus at any predetermined location, but the observations may be taken over a very great area by setting up this axially symmetric electromagnetic field. With this method a preliminary survey to obtain the proper location of the various stations is unnecessary and observations may be taken at will over a considerable area by placing the single large circle 1 in position.

Figure 3:
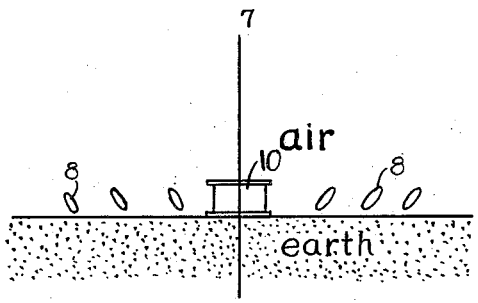
Fig. 3 is a section through the earth showing a modified arrangement, including a solenoid, for setting up the electromagnetic field.
Figure 6:
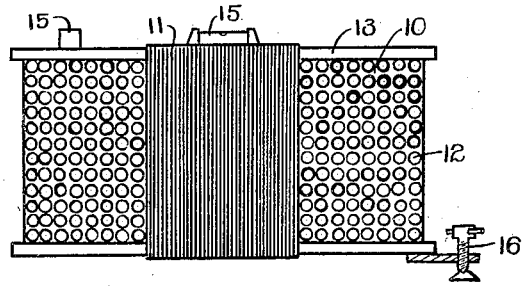
Fig. 6 is a sectional view showing one form of solenoid which may be used in conjunction with the form of invention shown in Fig. 3.
Figure 7:
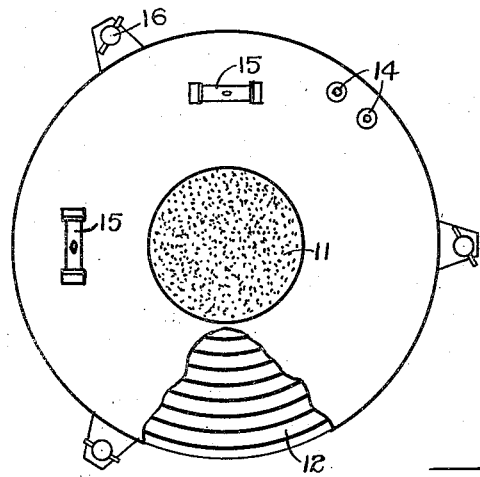
Fig. 7 is a top plan view of the solenoid shown in Fig. 6, with a certain portion broken away.

The invention may be practiced by setting up an electromagnetic field having axial symmetry by other types of apparatus. Figs. 3, 6 and 7 show such an apparatus which includes a solenoid 10, disposed directly on the earth's surface or mounted upon a truck or other vehicle. This solenoid 10 includes a core of iron wires or laminations 11 and the metallic windings 12, these windings being supported upon a suitable drum 13. The electrical connections for the windings are shown at 14 and the level vials at 15 are arranged at right angles to each other so that the solenoid may be adjusted with its axis in a perfectly vertical position. The adjustment of the solenoid is accomplished by means of the leveling screws 16. With a solenoid of the type here illustrated a very powerful electromagnetic field may be readily set up when an alternating electric current is passed through the windings. The electromagnetic field thus produced may be observed at much greater distances than in the case where buried electrodes are employed, especially when the earth's electrical conductivity is poor. If the earth is homogeneous and its surface plane and horizontal, this electromagnetic field will be symmetrical about the axis of the solenoid, and the magnetic component of the electromagnetic field at any point of observation not on the axis itself must be an elliptical vibration, the plane of which must coincide with the vertical plane passing through the vertical axis of symmetry 7 of the solenoid and the point of observation. The vibration ellipses of the magnetic field are indicated schematically at 8 in Fig. 3 as they were in Fig. 2. On the axis of symmetry the magnetic field lies along the axis and is therefore not elliptically polarized. With a solenoid such as here described it is quite easy to set up an electromagnetic field possessing axial symmetry about a vertical axis.

In practice the solenoid 10 is set up at a selected point on the earth and levelled. An alternating current of any frequency desired is then sent through the windings 12 of the solenoid. Observations are then made by means of a rotatable loop apparatus 40, the same being rotated until no current is induced into the loop. The plane of the loop now coincides with the plane of the vibration ellipse of the magnetic component of the electromagnetic field. By means of the scales 41' and 42 on the rotatable apparatus the orientation of the loop with respect to the earth's surface and the center of the solenoid may be ascertained, and thus the departure of this plane of the loop from the vertical plane passing through the axis of the solenoid may be noted. By coordinating these deviations at numerous points over the surface of the earth knowledge of the earth's subsurface may be obtained from the departure from axial symmetry of the field. This method has several distinct advantages over all previous methods. In the first place the powerful electromagnetic field may be observed over greater distances. Also observations may be made at any point on the earth's surface, or, if desired, at points well elevated above the surface of the earth, or even below the earth's surface in wells, etc. Similar remarks apply to the modification described in Figures 1 and 2 which produces an electromagnetic field which can be observed at a great distance.

Figure 4:
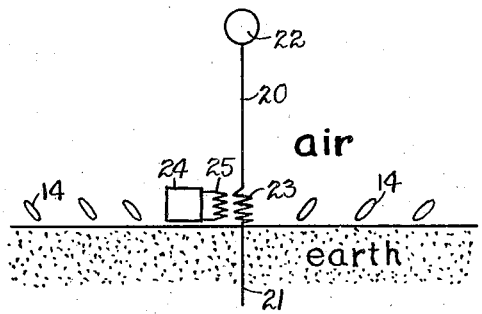
Fig. 4 is a section through the earth surface showing still another method, including a vertical antenna, for setting up the electromagnetic field.

Fig. 4 shows another modification wherein a vertical antenna 20 has been set up and is grounded at 21. In order to increase the capacity of this antenna a sphere or ball 22 is provided so that an oscillating circuit 24 may, by means of the coupling inductances 23 and 25, set up vibrations in the antenna. In this manner a symmetrical electromagnetic field is created. The vibration ellipses of the electric component of the electromagnetic field are indicated schematically at 14, and they must lie in a vertical plane passing through the antenna 20 when the earth is electromagnetically homogeneous. The magnetic component of the electromagnetic field is not elliptically polarized but runs in coaxial circles parallel with the earth's surface and having the axis of symmetry as a common axis. The magnetic field is thus always perpendicular to the electric field. It is to be understood that any preferred type of vertical antenna circuit and arrangement may be employed.

Figure 5:
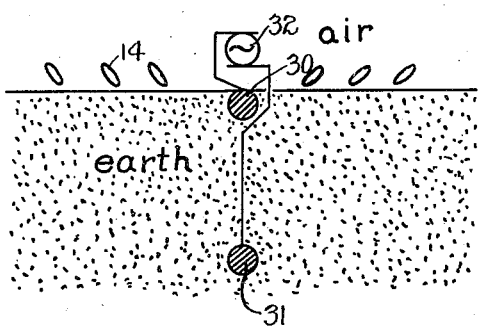
Fig. 5 shows still another method of setting up the electromagnetic field which includes vertical spacing of two buried electrodes.

Fig. 5 shows still another modification of the apparatus for performing the invention and illustrates two electrodes 30 and 31, which have been buried in the earth in a vertically disposed position with respect to each other. An alternating current generator is shown at 32 and is connected with each of the electrodes. This arrangement also sets up an electromagnetic field possessing axial symmetry such that the plane of the vibration ellipse 14 of the electric field will pass through the vertical axis of the two electrodes. The position of the vibration ellipse of the electric component of the electromagnetic field must be determined with an apparatus of the type shown in my copending application, Serial No. 340,481, filed February 16, 1929.

While I have shown and described several modifications of the apparatus for setting up the symmetrical field, it is to be understood that any suitable arrangement which will produce an electromagnetic field corresponding to that of an alternating electric or magnetic dipole with axis perpendicular to the earth's surface may be employed.

In particular the present method offers certain advantages over the invention as disclosed in my copending application Serial No. 249,802, filed January 27, 1928, for in the latter observations must be made along the line perpendicular to the electrode line if departure from symmetry is to be detected, whereas with this present invention observations may be made at any point desired. Also, and for similar reasons, this present invention offers advantages over the disclosure in my copending application Serial No. 340,481, filed February 16, 1929, for in the latter observations must be made along the electrode line produced if departure from symmetry is to be detected.

Having thus described my invention what I claim as new is:

1. A method of prospecting for buried mineral deposits comprising setting up an alternating electromagnetic field which would possess symmetry about a vertical axis were the earth electromagnetically homogeneous, making observations at a series of correlated points of the position in space of the plane of the vibration ellipse of the magnetic component of said electromagnetic field and coordinating the data so obtained.

2. A method of prospecting for buried mineral deposits comprising setting up an alternating electromagnetic field which would possess symmetry about a vertical axis were the earth electromagnetically homogeneous, making observations at a series of correlated points of the position in space of the plane of the vibration ellipse of the electric component of said electromagnetic field and coordinating the data so obtained.

3. A method of prospecting for buried mineral deposits comprising arranging a circular electromagnetic field with its plane parallel with the earth's surface by passing an alternating electric current about a circle, making observations at a series of correlated points of the position in space of the plane of the vibration ellipse of the magnetic component of the electromagnetic field, noting the deviation of the plane of this vibration ellipse from the plane passing through the axis of the circle and the point of observation, and coordinating the data so obtained.

4. A method of prospecting for buried mineral deposits comprising arranging an alternating magnetic dipole with its axis perpendicular to the surface of the earth, making observations at a series of correlated points of the position in space of the plane of the vibration ellipse of the magnetic component of the electromagnetic field, noting deviations of the plane of this vibration ellipse from the plane passing through the axis of the dipole and the point of observation, and coordinating the data so obtained.

5. A method of prospecting for buried mineral deposits by means of a solenoid set up with its axis perpendicular to the earth's surface, comprising passing an alternating electric current through the windings of said solenoid, making observations at a series of correlated points of the position in space of the plane of the vibration ellipse of the magnetic component of the resulting electromagnetic field, noting deviations of the plane of the vibration ellipse from the plane passing through the axis of the solenoid and the point of observation and coordinating the data so obtained.

6. The art of prospecting for buried mineral deposits comprising the steps of setting up a vertical antenna at a selected point, causing this antenna to radiate electromagnetic waves, making observations at a series of coordinated points of the position in space of the plane of the vibration ellipse of the electric component of this electromagnetic field, noting deviations of the plane of the vibration ellipse from the vertical plane passing through the antenna and the point of observation and co-ordinating the data so obtained.

7. A method of prospecting for buried mineral deposits comprising arranging a vertical electromagnetic field, one end being vertically below and deeper than the other end, passing an alternating electric current through the earth, making observations at a series of correlated points of the position in space of the plane of the vibration ellipse of the electric component of the resulting electromagnetic field, noting deviations of the plane of the vibration ellipse from the plane passing through both ends of said field and the point of observation and coordinating the data so obtained.

8. A method of prospecting for buried mineral deposits comprising setting up an alternating electromagnetic field in such a manner that it would have axial symmetry about a line perpendicular to the earth's surface were the earth electromagnetically homogeneous, making observations of the plane of the vibration ellipse of such field to determine the distortion of the field from axial symmetry due to the earth's subsurface not being electromagnetically homogeneous and coordinating the data so obtained.

9. A method of determining the existence and location of concealed objects comprising setting up an alternating electromagnetic field which would have axial symmetry in the absence of said concealed objects, making observations of the planes of the vibration ellipses of such field to determine the deviation of said electromagnetic field from axial symmetry due to the presence of said concealed objects and coordinating the data so obtained.

10. A method of prospecting for buried mineral deposits comprising setting up an alternating electromagnetic field which would possess axial symmetry were the earth's subsurface electromagnetically homogeneous, making observations of the planes of the vibration ellipses of such field to determine a departure of said electromagnetic field from a state of axial symmetry due to the nonhomogeneous and asymmetrical nature of the earth's subsurface and coordinating the data so obtained.

11. A method of prospecting for buried mineral deposits comprising arranging an alternating electric dipole with its axis perpendicular to the surface of the earth, making observations at a series of correlated points of the position in space of the plane of the vibration ellipse of the electric component of the electromagnetic field, noting deviations of the plane of this vibration ellipse from the plane passing through the axis of the dipole and the point of observation, and coordinating the data so obtained.

12. A method of subsurface prospecting, including setting up of an electromagnetic field by means of an alternating electromagnetic dipole wherein said electromagnetic field would possess axial symmetry about a line perpendicular to the earth's surface when the earth's subsurface is homogeneous, noting the departure from axial symmetry of the observed field as indicated by the plane of the vibration ellipse of such field and associating this loss of symmetry with presence and location of nonhomogeneous subsurface.

13. A method of subsurface prospecting to determine the nonhomogeneous nature of the earth's subsurface including setting up an electromagnetic field which is symmetrical about a central vertical axis, and taking observations of the plane of the vibration ellipse of such field at predetermined positions about such central axis.

14. A method of subsurface prospecting including setting up an electromagnetic field which would possess axial symmetry about an axis perpendicular to earth's surface were the earth electromagnetically homogeneous, making observations to determine a position on the earth's surface where the field is not elliptically polarized, and determining the direction in space of the simple alternating field at that point, and associating the departure of this point from its normal position with the presence and distribution of a nonhomogeneous earth subsurface.

NORMAN H. RICKER.